May 6, 1924.

A. B. BUCKLEY 1,492,829

METER FOR MEASURING THE VOLUME OF FLOW OF LIQUIDS IN OPEN CHANNELS

Filed Aug. 17, 1920    3 Sheets-Sheet 1

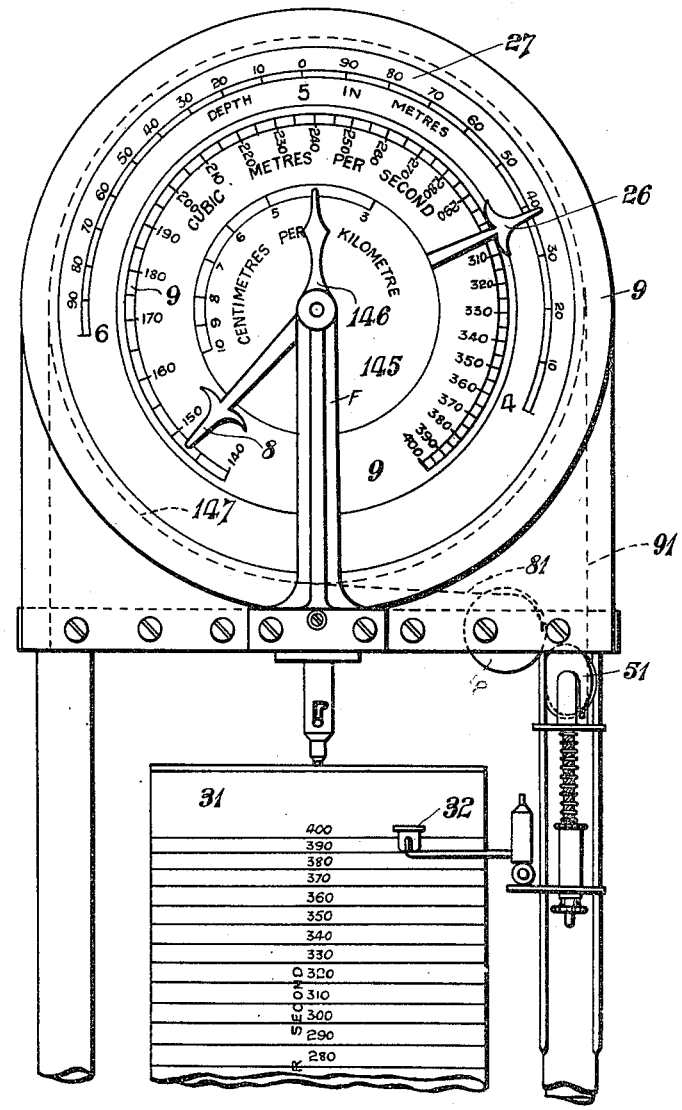

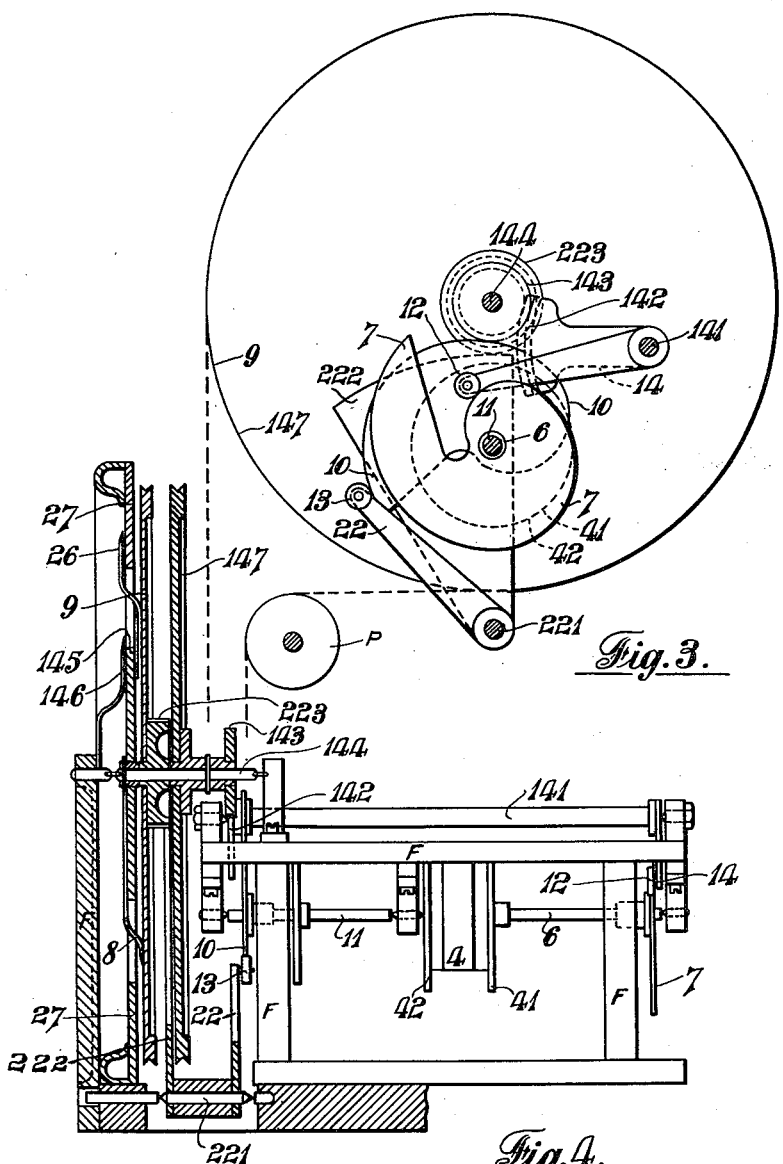

Patented May 6, 1924.

1,492,829

UNITED STATES PATENT OFFICE.

ARTHUR BURTON BUCKLEY, OF CAIRO, EGYPT.

METER FOR MEASURING THE VOLUME OF FLOW OF LIQUIDS IN OPEN CHANNELS.

Application filed August 17, 1920. Serial No. 404,222.

(GRANTED UNDER THE PROVISIONS OF THE ACT OF MARCH 3, 1921, 41 STAT. L., 1313.)

*To all whom it may concern:*

Be it known that I, ARTHUR BURTON BUCKLEY, a subject of the King of Great Britain, residing at Ma-adi, Cairo, Egypt, have invented new and useful Improvements in and Relating to Meters for Measuring the Volume of Flow of Liquids in Open Channels (for which I have filed application for patent in Great Britain, No. 14,239, dated June 12, 1914), of which the following is a specification.

This invention relates to meters for measuring the volume of flow of liquids in open channels, and to means for making a continuous record of the same.

It consists essentially in means whereby the difference of level of the liquid, water for instance, at two points in the channel (that is, the hydraulic gradient between the two points) and the depth of water at one of the said points or an intermediate or adjacent point are utilized to operate mechanism to indicate or record the volume of flow of the water.

Figures 2-4 illustrate its structural form;

Figure 1:
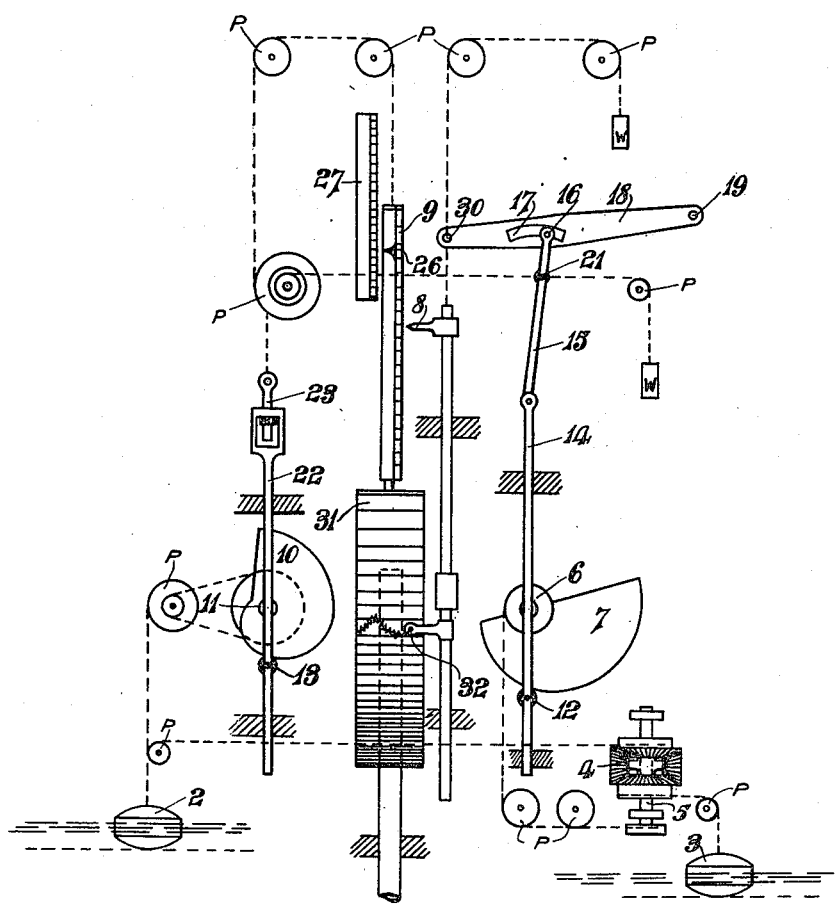
Figure 1 is a diagrammatic sketch of the apparatus.

Figure 2 being an elevation looking at the dial face and recording drum,

Figure 3 an elevation showing the arrangement of the cams and their transmission mechanism, Figure 4 a sectional view.

Details of the framework and casing, as well as the electrical or other apparatus by which the rise and fall of the floats is transmitted, are omitted.

For carrying out the invention two floats, 2 and 3, are placed at a suitable distance apart along the length of the channel, and the difference in level between the two floats is transmitted to the meter. In consequence of the flat hydraulic gradients which obtain in most open channels or canals, the distance between the two floats may be considerable. The transmission from the floats to the meter is therefore preferably electrical, and any known apparatus for transmitting indications of water level to a distance may be adopted for the purpose.

The volume of flow per unit of time Q is equal to the product of the channel's sectional area A and the velocity V of the liquid, that is Q=AV. The velocity V of the liquid involves the hydraulic gradient S, the hydraulic mean depth R, and the coefficient of roughness of the channel $n$. V can be expressed in terms of S, R, $n$, and certain arbitrary constants, by Kutter's or other well known formula. By suitable mechanism the value of V at any instant may be indicated from the levels of the two floats aforesaid. Also by suitable mechanism the value of A at one point of the canal may be deduced from the level of the float at the said point. If these values of A and V are represented logarithmically and are indicated by pointers moving on scales logarithmically subdivided, the algebraic sum of the movements will be equal to the logarithm of Q.

In carrying out the invention, the vertical movements of the two floats are transmitted by a differential gear 4 to a shaft 5 in such a manner that the angle of rotation of the shaft is proportional to the difference of level of the two floats, that is the hydraulic gradient. Mounted on the said shaft, or on a shaft 6 actuated by it by means of gearing, is a cam 7 which may be called the "velocity cam," so designed that it transmits to an index finger 8 moving over a scale 9 or the equivalent, a displacement proportional to the logarithm of the "velocity ratio" of the liquid in the channel. One of the two floats, or a third float, which may be called the "depth float" actuates by suitable gearing a second cam 10 mounted on a shaft 11 which may be called the "area cam," so designed as to transmit to the scale hereinbefore mentioned or the equivalent a displacement proportional to the logarithm of the "nominal discharge" of the channel. Contact pieces or rollers 12 and 13 suitably guided are kept pressed by suitable means against the cams 7 and 10, respectively and the displacements of the said contact rollers produced by the rotation of the cams are transmitted to the index finger 8 and scale 9, as above described. The displacement of the aforesaid index finger relative to the scale 9 is the sum of the two said displacements, that is proportional to the logarithm of the discharge Q; and the scale being divided logarithmically, the reading given by the index finger indicates the discharge.

The "nominal discharge" above referred to is the discharge for each area or related depth corresponding to a constant arbitrary "nominal" slope. The "velocity ratio" is the ratio of the discharge at any slope to the discharge at the above "nominal" slope.

The attachment of the cams to the shafts or other mechanism which operate them, may be made adjustable by interposing a worm wheel or tangent adjusting screw so that the cam may be turned relatively to the shaft and the rest of the mechanism.

The scale may be made stationary by introducing the necessary mechanism to cause the index finger or recording pen to have a movement which is the sum of the two movements described above.

In one method of compensating for the "velocity ratio" not being quite independent of the depth of water in the channel, the range of movement of the index finger due to change in hydraulic gradient may be made to depend on the depth, by making the gradient or "velocity ratio" cam wide and tapering in an axial direction, enabling it to produce a greater range of movement at one end than at the other. The position of the roller or point bearing against the cam would be moved in an axial direction by the mechanism operated by the depth float. In Fig. 1 an equivalent method of compensating is shown, consisting of a variable leverage mechanism interposed between the contact roller 12 and index finger 8. The rod 14 which carries the contact roller 13 has a radius rod 15 jointed to its end. The other end 16 of the radius rod rests in a slot 17 cut in a lever 18, one end of which is supported on a fixed pivot 19, and the other end 30 supports the index finger 8. The radius rod is connected at 21, by means of a flexible cord passing over guide pulleys P, to the rod 22 carrying the contact roller 13; and adjusting screw 23 being interposed. The flexible cords in the apparatus are suitably arranged to pass over guide pulleys P, and are kept taut by counterbalance weights W.

The moving scale 9 being operated by the depth float 2, an index mark 26 on the said scale may point to a fixed scale 27, which may be calibrated to the depth, or to sectional area of the channel, as desired.

The structural forms in which the invention may be carried out are numerous, but the foregoing description applies to the necessary kinematical elements. The transmission from the two cams aforesaid may be by flexible cords as shown diagrammatically in Fig. 1, or by contact with oscillatory levers, which in turn transmit their movements by toothed wheel or other gearing to the index portion of the apparatus, as hereinafter described. These may show (1) the "velocity ratio" or the hydraulic gradient, (2) the depth, or the sectional area of the channel, and (3) the discharge. They may be arranged as three concentric dials and index fingers. Some of the dials may be fixed, the corresponding index fingers movable, or vice versa.

In the structural design of the apparatus illustrated in Figs. 2-4, toothed wheel mechanism is employed to transmit the movement from the cams to the various scales which are arranged concentrically in front of the meter. Index numerals as in Fig. 1 are used for corresponding parts which perform the same functions.

The differential gear 4 has the movements of the two floats transmitted to ratchet wheels 41 and 42 or the like fixed to or integral with its two members, by means of electrical apparatus which does not form part of this invention. The shaft 6, "velocity cam" 7, and contact roller 12 perform the functions already described. The contact roller 12 is carried by a lever arm 14 fixed on a shaft 141 suitably mounted on the framework F of the meter. Fixed to the said shaft is a toothed sector 142, which engages with a toothed wheel 143 fixed to the shaft 144. A circular disc 145 is fixed to the said shaft, and carries a calibrated scale of difference in level of the two floats: that is, a scale of hydraulic gradient. The corresponding index pointer 146 is fixed to the framework. The disc 145 may also carry a scale of "velocity ratio" corresponding to the hydraulic gradients.

The depth float 2 has its rise and fall movement transmitted electrically to the shaft 11, arranged coaxial with the shaft 6 and differential gear 4. The shaft 11, "area cam" 10, and contact roller 13 perform the functions already described. The contact roller 13 is carried by a lever arm 22, fixed to a shaft 221 suitably mounted on the framework. Fixed to the said shaft is a toothed sector 222, which engages with a toothed wheel 223. The said toothed wheel is mounted on the aforesaid shaft 144, and is free to turn thereon. A circular disc 9, which carries the scale of discharge, is fixed to and turns with the toothed wheel 223, and the corresponding index pointer 8 is fixed to the disc 145.

A calibrated scale of depth is engraved on the annular disc 27, fixed to the framework and the corresponding index pointer 26 is fixed to the disc 9.

The recording part of the apparatus consists of a clock driven drum 31 on which the chart is wrapped revolving in contact with a pen 32 which receives a relative displacement proportional to that of the discharge index finger in a direction parallel to the axis of the drum. The said relative displacement may be obtained by axial displacements of the drum and pen transmitted from the "area" and "velocity cams" respectively, as shown in Fig. 1, or the axis of the drum may be stationary and the pen receive a displacement equal to the algebraic sum of the displacements given by the "area" and "velocity cams."

In Fig. 2, the recording drum 31 is not displaced along its axis as shown in Fig. 1, and the movement of the pen 32 is therefore derived from the sum of the angular movements of the discs 9 and 145. To obtain the required movement of the pen, the disc 9 is grooved at its periphery, and a similarly grooved disc 147 is rigidly fixed to the shaft 144, or toothed wheel 143 to which the disc 145 is fixed. A flexible cord having its two ends attached to the peripheries of the discs 9 and 147 respectively, passes over suitable guide pulleys P and round the pulley 51 from which the pen is suspended.

I claim:—

1. In a meter for measuring the flow of liquids in open channels, a logarithmic scale, a cam; means for moving said cam proportionally to the hydraulic gradient between two points in the channel; a second cam; means for moving said second cam proportionally to the depth of the water in the channel at one point; a moving member adapted to be actuated by said first mentioned cam, said first mentioned cam being shaped to displace said moving member proportionally to the logarithm of the "velocity ratio" of the liquid in the channel; a moving member adapted to be actuated by said second cam, said second cam being shaped to displace said second mentioned moving member proportionally to the logarithm of the nominal discharge of the channel, and means for indicating the sum of the displacements of said first and second mentioned moving members upon said logarithmic scale.

2. A meter for measuring the flow of liquids in open channels according to claim 1, including index fingers mounted upon said first and second mentioned moving members and scales cooperating with said index fingers and graduated to indicate depth, sectional area, velocity ratio and hydraulic gradient, said logarithmic scale being graduated to indicate volume of flow.

In testimony whereof I affix my signature.

ARTHUR BURTON BUCKLEY. [L. S.]